Nov. 14, 1939.   O. W. NESBITT   2,179,983
TIRE CHAIN
Filed July 5, 1938
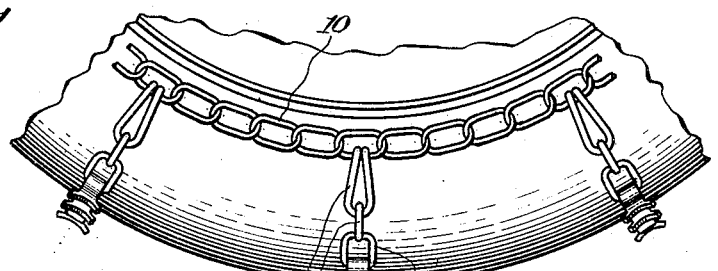
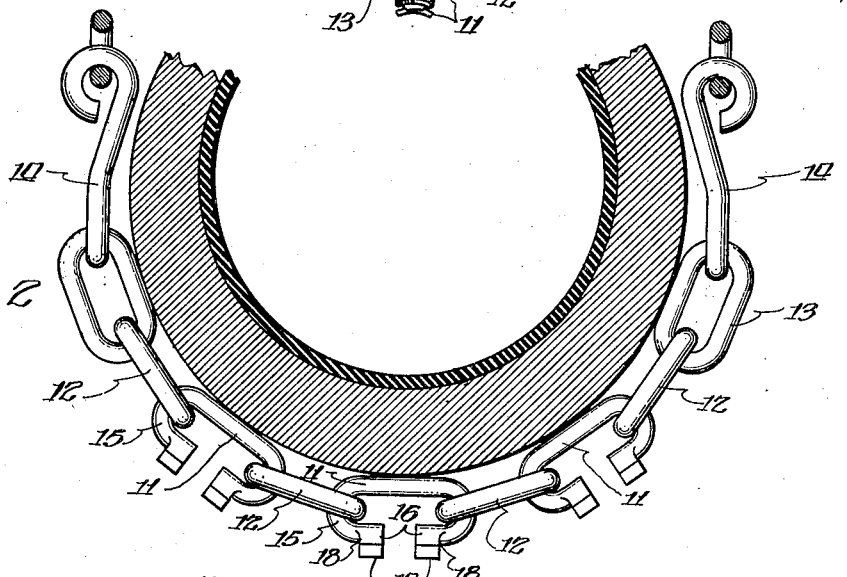
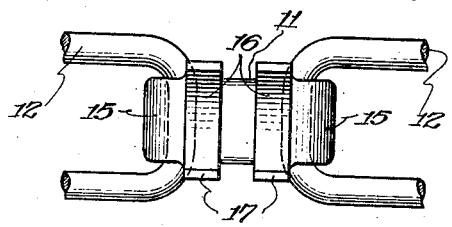
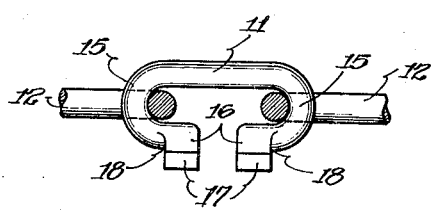
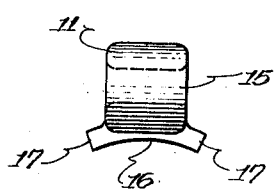
Inventor:
Orville W. Nesbitt.
By. Brayton Richards
Attorney.

Patented Nov. 14, 1939

2,179,983

UNITED STATES PATENT OFFICE 2,179,983

TIRE CHAIN

Orville W. Nesbitt, Chicago, Ill., assignor of one-third to Zaffereos J. Sermopoulas, Chicago, Ill.

Application July 5, 1938, Serial No. 217,428

2 Claims. (Cl. 152—243)

The invention relates to improvements in tire chains and has for its primary object the provision of an improved construction of this character, capable of economical production and highly efficient in use.

Another object of the invention is the provision of an improved means for engaging a roadway.

Other objects of the invention will appear hereinafter.

The invention consists in the combinations and arrangements of parts hereinafter described and claimed.

The invention will be best understood by reference to the accompanying drawing forming part of the specification and in which:

Fig. 1 is a partial side view of an automobile tire equipped with a chain embodying the invention;

Fig. 2 is an enlarged transverse section of said tire, showing the same in position thereon;

Fig. 3 is a bottom plan view of one of a plurality of tread members embodied in the construction;

Fig. 4 is a longitudinal section of one of said tread members;

Fig. 5 is an end view of one of said tread members.

The embodiment of the invention illustrated in the drawing comprises the usual side chains 10 connected by traction members, as shown. Each of these traction members comprises alternate tread members 11 and chain links 12 detachably engaged therewith. The end links 12 are connected by additional links 13 with hooks 14 by means of which each of the traction members is attached to the side chains 10 as will be readily understood.

Each of the tread members consists of a smooth continuous flat body portion adapted to rest against the tread portion of a tire without injury thereto during use, the contact surface of each tread member being comparatively broad, smooth and unbroken for this purpose. The body portion of each tread member has extensions 15 at its ends extending downwardly and under the bottom thereof terminating in T-heads 16 with space between them to form entry slots for the links 12, so that said traction members may be readily assembled and the tread members readily renewed in case of wear or breakage. The ends 17 of the T-heads 16 are bent downwardly as shown to present sharp edges to engage the roadway, and each T-head 16 is made somewhat thicker than its extension 15, thereby providing sharp shoulders 18 at their junctures, thus providing additional sharp engaging edges to engage the roadway, particularly when covered by ice or snow.

By the arrangement tread members are provided having comparatively broad, smooth and unbroken bearing surfaces for the tire tread and presenting sharp and penetrating members to engage the roadway to prevent slippage in any direction particularly when the roadway is covered by ice or snow. The specific form and arrangement of parts disclosed is a simple and effective one for the purpose.

While I have illustrated and described the preferred form of carrying my invention into effect, this is capable of modification and variation without departing from the spirit of the invention. I therefore do not wish to be limited to the precise details disclosed but desire to avail myself of such variations and modifications as fall within the scope of the appended claims.

I claim:

1. A tread member for tires comprising a body arranged to rest against a tire and having extensions at its ends extending downwardly and under the bottom thereof terminating in T-heads with spaces between them to form entry slots for chain links the sides of said T-heads being bent downwardly to engage the roadway.

2. A tread member for tires comprising a body arranged to rest against a tire and having extensions at its ends extending downwardly and under the bottom thereof terminating in T-heads with spaces between them to form entry slots for chain links the sides of said T-heads being bent downwardly to engage the roadway and said T-heads being somewhat thicker than said extensions to form sharp shoulders at their junctures.

ORVILLE W. NESBITT.